United States Patent [19]

Iwashita et al.

[11] Patent Number: 5,581,595
[45] Date of Patent: Dec. 3, 1996

[54] TELEPHONE WITH AN AUTO DIALING FUNCTION

[75] Inventors: Yoshinobu Iwashita, Kasugai; Minoru Murakami, Moroyamamachi, both of Japan

[73] Assignee: Casio Computer Co., Ltd., Tokyo, Japan

[21] Appl. No.: 365,950

[22] Filed: Dec. 29, 1994

[30] Foreign Application Priority Data

Jan. 10, 1994 [JP] Japan ..................... 6-013155

[51] Int. Cl.⁶ ..................................... H04Q 7/38
[52] U.S. Cl. .............. 379/57; 379/58; 379/210; 379/211; 379/354; 379/355
[58] Field of Search ............... 379/57, 58, 59, 379/61, 210–212, 354, 355

[56] References Cited

U.S. PATENT DOCUMENTS

| | | | |
|---|---|---|---|
| 5,095,503 | 3/1992 | Kowalski | 379/354 |
| 5,134,717 | 7/1992 | Sogaard | 379/354 |
| 5,265,145 | 11/1993 | Lim . | |
| 5,329,578 | 7/1994 | Brennan et al. | 379/57 |
| 5,363,435 | 11/1994 | Demuyack . | |
| 5,392,342 | 2/1995 | Rosenthal | 379/210 |
| 5,430,791 | 7/1995 | Feit et al. | 379/211 |
| 5,475,748 | 12/1995 | Jones | 379/211 |

FOREIGN PATENT DOCUMENTS

| | | |
|---|---|---|
| 0251296A2 | 1/1988 | European Pat. Off. . |
| 0417986A2 | 3/1991 | European Pat. Off. . |
| 0542049A2 | 5/1993 | European Pat. Off. . |
| 3421752A1 | 12/1985 | Germany . |
| 4038320C2 | 6/1992 | Germany . |

*Primary Examiner*—Dwayne D. Bost
*Attorney, Agent, or Firm*—Frishauf, Holtz, Goodman, Langer & Chick

[57] ABSTRACT

In a telephone system, a memory dial mode is set by operating a mode key of a radio telephone, and then a selection key is manipulated to select a public telephone number of an opposite (called) radio telephone. Thereafter, when a dialing key is operated, a dialing output process to the public telephone number selectively displayed on a LCD (liquid crystal display) unit is performed. When a telephone ending key is operated while a telephone line is not connected, a private telephone number of the radio telephone previously stored into a RAM is displayed on the LCD unit. Subsequently, when the dialing key is operated, another dialing output process to the private telephone number displayed on the LCD unit is executed.

12 Claims, 16 Drawing Sheets

FIG.2

| PUBLIC TELEPHONE NUMBER | ID CODE | PRESENT AREA NUMBER |
|---|---|---|
| | | |
| | | |
| | | |
| | | |

FIG.6

| NAME | TELEPHONE NO. | RELATED TELEPHONE NO. |
|---|---|---|
| FRISHAUF | PUBLIC TELEPHONE NO. | PRIVATE TELEPHONE NO. |
| HOLTZ | PUBLIC TELEPHONE NO. | PRIVATE TELEPHONE NO. |
| GOODMAN | PUBLIC TELEPHONE NO. | TELEPHONE NO. IN VOICE MAIL CENTER |
| | | |
| | | |

FIG.9

HOLTZ

PUBLIC TELEPHONE NO.

HOLTZ

PRIVATE TELEPHONE NO.

| NAME | TELEPHONE NO. | 1ST RELATED TELEPHONE NO. | 2ND RELATED TELEPHONE NO. |
|---|---|---|---|
| HOLTZ | PUBLIC TELEPHONE NO. | PRIVATE TELEPHONE NO. | TELEPHONE NO. IN VOICE MAIL CENTER |
| | | | |
| | | | |
| | | | |

FIG.13

```
HOLTZ                          CONT

PRIVATE TELEPHONE NO.

```
HOLTZ

TELEPHONE NO. IN
VOICE MAIL CENTER 03-9999-5678
```

FIG.17

| NAME | TELEPHONE NO. | RELATED TELEPHONE NO. |
|---|---|---|
| FRISHAUF | PUBLIC TELEPHONE NO. | PRIVATE TELEPHONE NO. |
| HOLTZ | PUBLIC TELEPHONE NO. | PRIVATE TELEPHONE NO. |
| GOODMAN | PUBLIC TELEPHONE NO. | TELEPHONE NO. IN VOICE MAIL CENTER |
| WOODWARD | PUBLIC TELEPHONE NO. | PAGING TELEPHONE NO. |
| | | |
| | | |

TELEPHONE WITH AN AUTO DIALING FUNCTION

BACKGROUND OF THE INVENTION

1. Field of the Invention

The present invention generally relates to a telephone. More specifically, the present invention is directed to a telephone capable of being increasing the call connection efficiency in the telephone system.

2. Description of the Prior Art

Very recently, rapid digital technology has been realized in the mobile communication system, so that the analog type mobile communication system could be replaced by the digital type mobile communication system. Normally, the control signal should be transmitted and received between the radio base station connected to the communication line network and the portable telephone in the mobile communication system. When the digital signal is utilized as this control signal, it is possible to establish such a basic system capable of realizing radio signal transmissions at a high efficiency and also high communication quality. Moreover, utilization of the digital technique in the mobile communication system could make compact radio base stations as well as compact portable telephone, resulting in easy portability of the portable telephone.

Under such circumstances, a substantial amount of digital portable telephones have been rapidly marketed. This is because various problems of the conventional analog type portable telephone system could be effectively solved. That is, since the usable frequency allocation in the analog type portable telephone system is restricted, it is not so easy to increase the total number of telephone subscribers. Furthermore, the privacy of telephone conversations could not be satisfactorily protected. However, these problems belonging to the analog type portable telephone system can be successfully solved by the digital type portable telephone system.

On the other hand, a so-called "second generation cordless telephone system" in which the digital technology is comprehensively utilized is practically studied. A radio telephone utilized in this second generation cordless telephone system has such a feature that this radio telephone may be used as the original portable telephone and also a cordless telephone of a mother telephone.

In other words, the radio telephone used in the second generation cordless telephone system separately establishes one communication channel with the public radio base station connected to the communication line network, and another communication channel with the private (customer) radio base station corresponding to the own mother telephone. Also, the communication areas capable of establishing the independent communication channels between the respective base stations and the own telephone. However, there is a limitation in using the cordless (radio) telephone belonging to the private radio base station, although any radio telephones can be freely used with the public radio base station. When the dialed (called) radio telephone is used as the cordless telephone, the telephone calling person needs to dial the customer telephone number (private telephone number) of the radio telephone. When the called radio telephone is used as the portable telephone, the telephone calling person needs to dial the telephone number (public telephone number) of the radio telephone itself.

In this second generation cordless telephone system, the communication areas of the radio base stations are limited to the small zones referred to as "microcells". In these microcells, the same frequencies are repeatedly utilized to make up a large number of communication channels. In other words, the limited frequency resource can be effectively utilized. Furthermore, since the dimension of the communication zone (cell) is restricted to a small value, the transmission power of the radio telephone may be made low, so that a compact radio telephone with low power consumption can be made available. That is, the physical size of the batteries mounted on this radio telephone becomes small, and a long operation time of the radio telephone can be achieved.

However, the above-described second generation cordless telephone system has the following drawbacks. That is, while an available range of communication for one radio base station is limited to several hundred meters (radial direction), the same frequencies are usable in the different communication zones at the same time so as to effectively allocate all the usable radio frequencies. To this end, the radio base stations must be installed at 100 meter intervals. Thus there is such a problem that the radio telephone should be continuously located near the relevant radio station, e.g., shorter than 100 meters. When the opposite (called) radio telephone is used as the cordless telephone of the mother telephone, and even when the telephone calling person dials the public telephone number of this called radio telephone, he cannot access this called radio telephone. On the other hand, when the opposite radio telephone is utilized as the portable telephone, there is another problem that even if the telephone calling person dials the private telephone number of this called radio telephone, then he cannot access this called radio telephone.

There are some possibilities in the second generation cordless telephone system that the radio telephone cannot establish the communication in case that the radio telephone is located outside the available range of communication covered by the public radio base station, is not set to the telephone waiting condition, or the relevant communication channel is fully occupied by other radio telephones.

One solution has been proposed as the radio telephone equipped with the paging function. That is, the radio telephone is combined with a pager with low power consumption operable in the paging system which can cover a wider communication range than that of the second generation cordless telephone system. That is, such a wide communication range can be established by utilizing the radio telephone with the paging function in such a manner that the pager communication can be made with another radio telephone equipped with the paging function located outside the available range of communication in the second generation cordless telephone system.

However, when no telephone line is connected in case that the user issues the telephone calling to the opposite (called) radio telephone with the paging function by utilizing the second generation cordless telephone system, he should make another telephone calling with using the paging system. Under such circumstances, there is a drawback that a desired telephone number is selected from a plurality of stored telephone numbers, or the relevant telephone number should be inputted so as to make a telephone call.

SUMMARY OF THE INVENTION

An object of the present invention is to provide a telephone capable of simply dialing a telephone number related to a desired telephone number when no telephone line is connected in case that this desired telephone number is dialed.

To achieve the object, a telephone, according to one aspect of the present invention, comprises memory means for storing both a telephone number of a called person and a telephone number related to the first-mentioned telephone number; and instruction means for instructing to make a telephone call to said related telephone number stored in said memory means when no telephone line is connected in case that a telephone call is made to said telephone number of the called person.

In the telephone with the above-described arrangement, when no telephone line is connected in case that the desired telephone number is dialed, another telephone number related to this desired telephone number can be simply dialed. As a result, the call connection efficiency can be increased.

BRIEF DESCRIPTION OF THE DRAWINGS

For a better understanding of the present invention, reference is made of the detailed description to be read in conjunction with the accompanying drawings, in which:

FIG. 2 is a schematic storage region of a memory employed in the control center of FIG. 1;

FIG. 6 schematically represents a memory map about names, telephone numbers, and other telephone numbers related thereto, which are registered in the RAM of FIG. 5;

FIG. 9 indicates a display example of the public telephone number registered in the RAM of FIG. 5;

FIG. 10 represents a display example of the private telephone number registered in the RAM of FIG. 5;

FIG. 11 schematically shows another memory map about names, telephone numbers, and other telephone numbers related thereto, registered in the RAM of FIG. 5;

FIG. 13 is another display example of the private telephone number registered in the RAM of FIG. 5;

FIG. 14 is a display example of the telephone number in the voice mail center, registered in the RAM of FIG. 5;

FIG. 17 schematically shows another memory map about names, telephone numbers, and other telephone numbers related thereto registered in the RAM of FIG. 16;

DETAILED DESCRIPTION OF THE PREFERRED EMBODIMENTS

Overall Telephone Communication System

Figure 1:
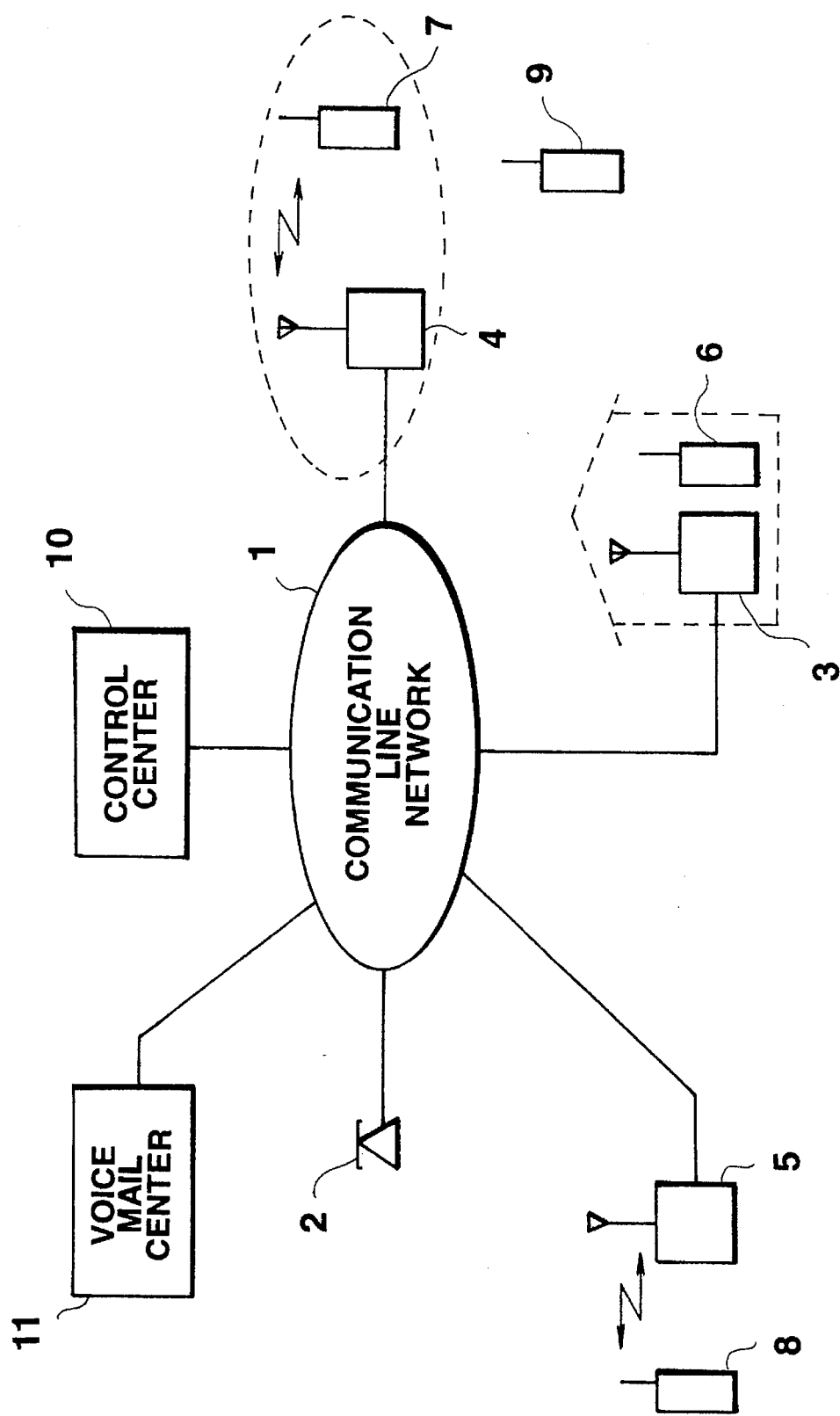
FIG. 1 schematically represents the overall system arrangement of the second generation cordless telephone system in which a telephone according to the present invention is utilized.

Referring now to FIG. 1 to FIG. 8, a telephone according to a first preferred embodiment of the present invention will be described in detail. In FIG. 1, there is schematically shown an overall telephone communication system of the second generation cordless telephone system to which the radio telephone according to the first preferred embodiment is applied. As represented in FIG. 1, this cordless telephone system is arranged by a communication line network 1, a telephone 2 connectable via a station line to this communication line network 1, a customer mother telephone 3, and public radio base stations 4 and 5 for public use. To the customer mother telephone 3, the radio telephone 6 utilized as the cordless telephone in the second generation cordless telephone system is accessed. To the public radio base stations 4 and 5 for public use, the radio telephones 7 and 8 utilized as the portable radio in the second generation cordless telephone system are accessed. Otherwise, another radio telephone 9 is accessed to the public radio base stations 4 and 5 when this radio telephone enters into the radio communication zones or areas of these public radio base stations 4 and 5. Also, the radio telephone 6 is brought out from the home so as to be used as the portable telephone in the second generation cordless telephone system, and may be used as the portable telephone when this radio telephone 6 is located within the radio communication zones of the public radio stations 4 and 5.

In FIG. 1, reference numeral 10 indicates a control center in the second generation cordless telephone system. This control center 10 employs a memory capable of storing a plurality of public telephone numbers (telephone numbers used in public line) for plural radio telephones, a plurality of ID codes, and a plurality of present area numbers for registering where the radio telephones are presently located (see FIG. 2). Upon receipt of a telephone number of a radio telephone 7, 8, or 9 in question from the public radio base stations 4 or 5 via the communication network 1, the control center 10 retrieves this telephone number from the above-described memory. Then, when this retrieved telephone number is registered in this memory, the control center 10 transmits a calling signal to such a radio telephone, the position of which has been registered based on the present area number stored in correspondence to this telephone number. Also, reference numeral 11 indicates a voice mail center. This voice mail center is utilized as follows. In case that a telephone calling person could not succeed in the line connection with another radio telephone to be called, he may record his message in the message mail box of the vice mail center, and thereafter a called person may access this message mail box to fetch the above-described message.

It should be noted that this communication line network 1 may be realized by employing PSTN (Public Switched Telephone Network) and ISDN (Integrated Service Digital Network).

Outer Appearances of Portable Telephone/Customer Mother Telephone

Figure 3:
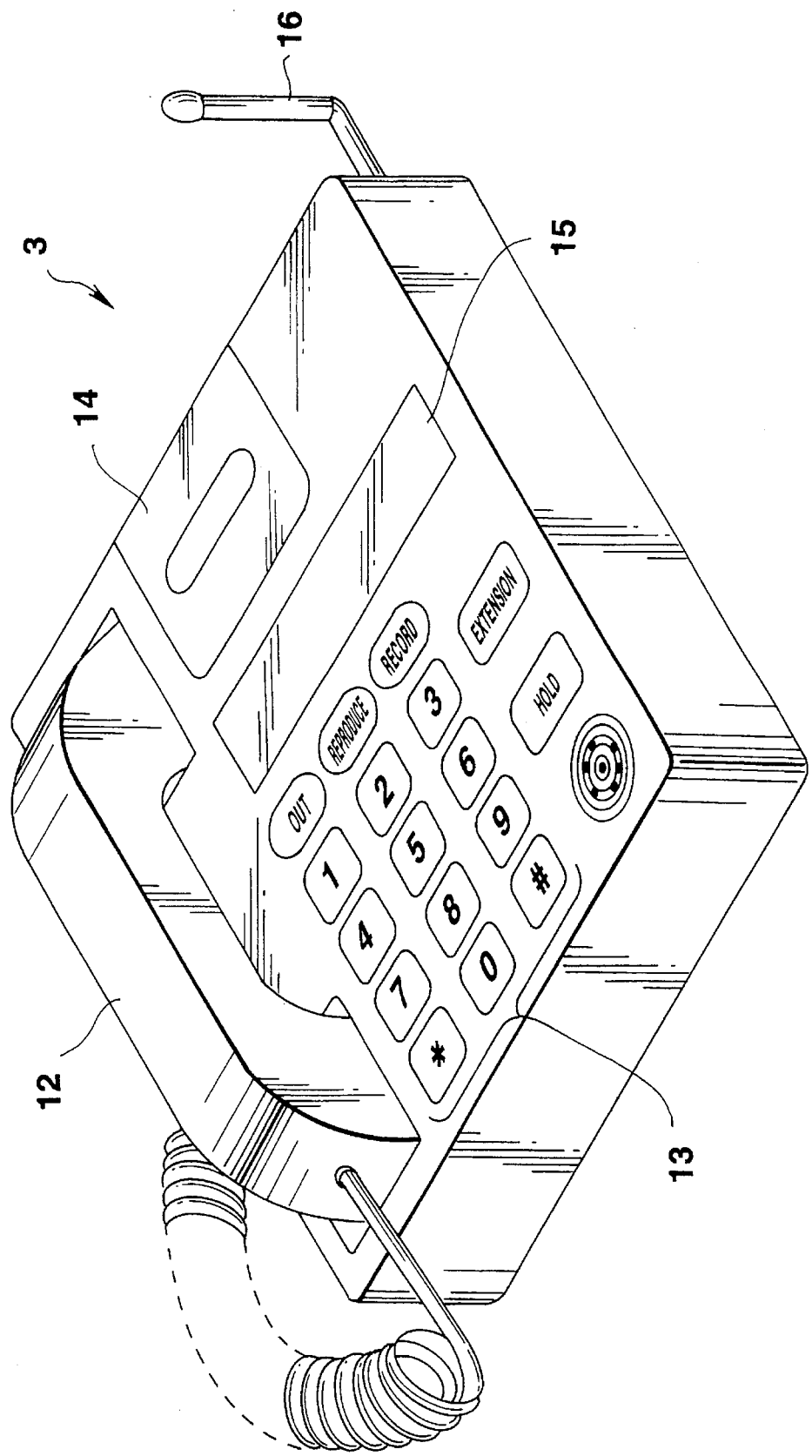
FIG. 3 is a perspective view for showing a mother telephone installed in a home.

FIG. 3 shows an outer appearance of the customer mother telephone 3 used in the telephone system of FIG. 1. As illustrated in FIG. 3, the customer mother telephone 3 is arranged by an handset 12 having therein a microphone for inputting voice and a speaker for reproducing voice; a key input unit 13 equipped with a number entry key used to enter telephone numbers and an operation key used to operate a telephone answering machine 14; and the telephone answering machine 14 for recording a voice message received during the automatic answering mode. The customer mother telephone 3 is further comprised of a liquid crystal display (LCD) unit 15 for displaying a key entered content made by the key input unit 13, a message recorded in the telephone answering machine 14, and various sorts of function guide; and an antenna 16 for transmitting/receiving a radio signal to/from the radio telephone 6.

Figure 4:
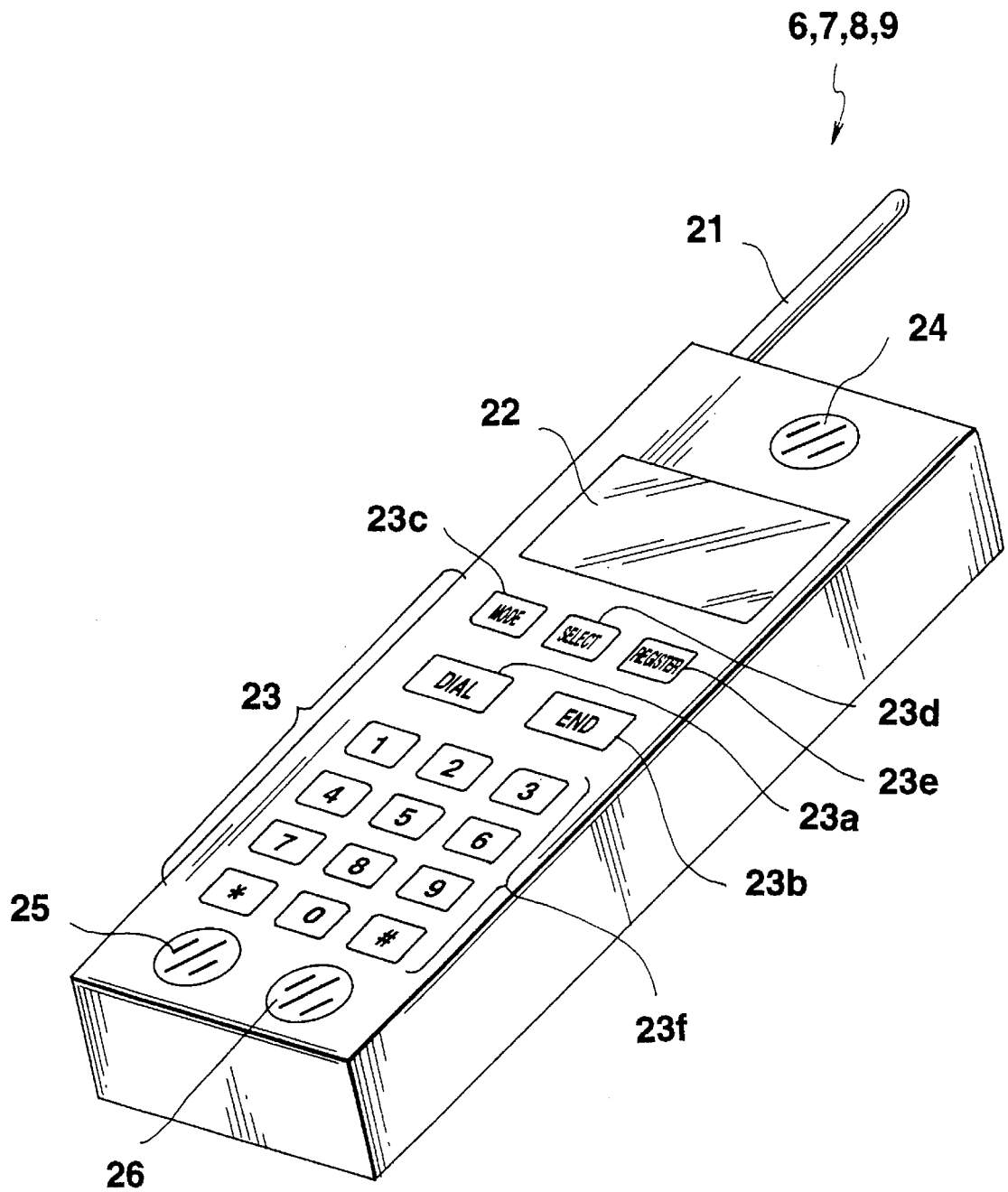
FIG. 4 is a perspective views for indicating a radio telephone utilized as a portable telephone, or a cordless telephone belonging to the mother telephone within the telephone system of FIG. 1.

FIG. 4 schematically shows an outer appearance of the above-described radio telephone 6, 7, 8, or 9 employed in the telephone system of FIG. 1. As shown in FIG. 4, the radio telephone is provided with an antenna 21 for transmitting/receiving the radio signal among the customer mother telephone 3 and the public radio base stations 4, 5; and a LCD (liquid crystal display) unit 22 for displaying a key entered content made by the key input unit 23, and various sorts of function guidance. This radio telephone is further provided with such a key input unit 23 comprised of a dialing key 23a, a telephone ending key 23b, a mode key 23c, a selection key 23d, and a register key 23e, and also a numeral entry key 23f; a speaker 24 for reproducing voice; a microphone 25 for inputting a voice message; and a speaker 26 for ringing purposes.

Circuit Arrangement of Radio Telephone

Figure 5:
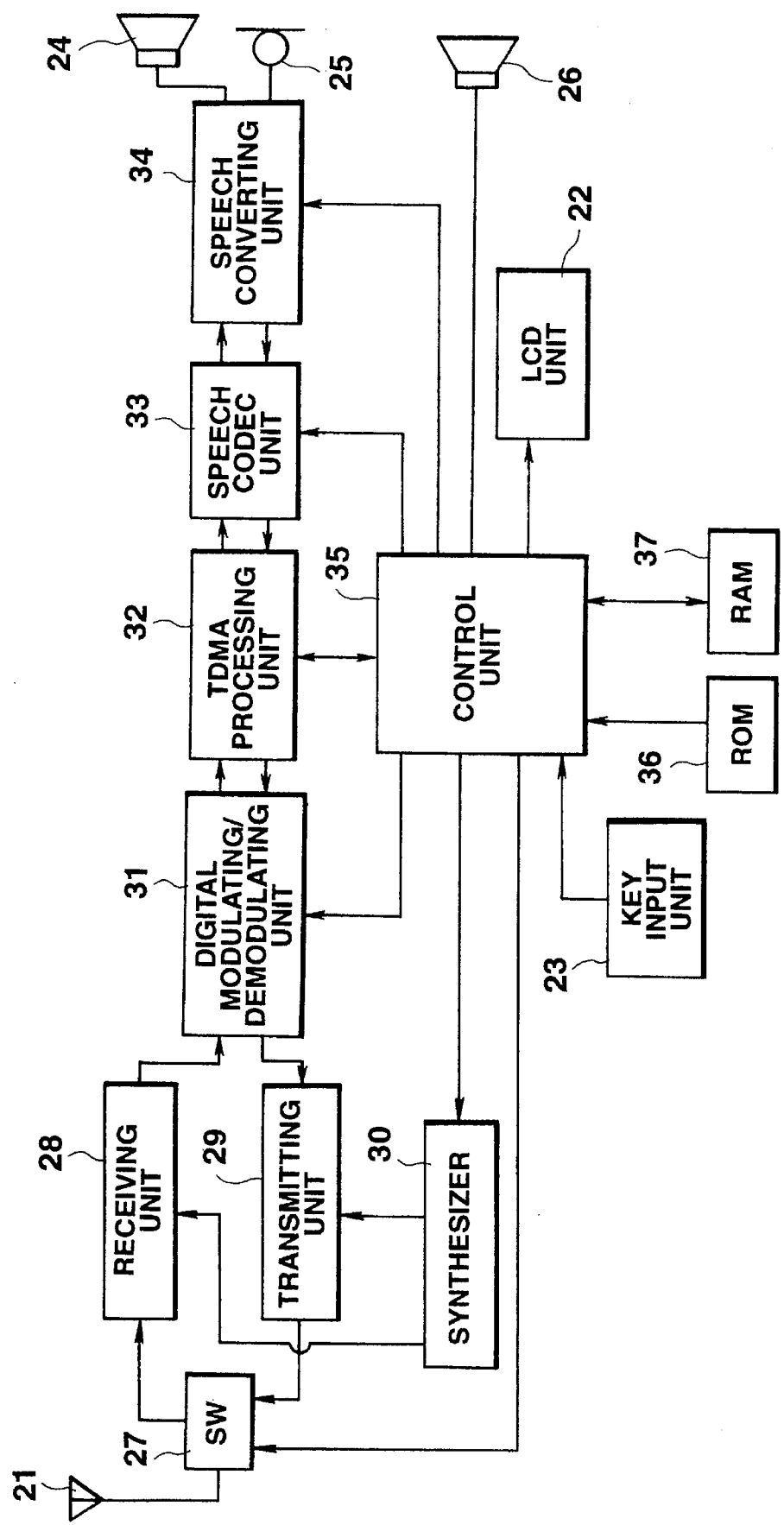
FIG. 5 is a schematic block diagram for indicating a circuit arrangement of the radio telephone shown in FIG. 4.

In FIG. 5, there is shown a circuit block diagram of the radio telephone shown in FIG. 4. This radio telephone includes a switch (SW) 27, a receiving unit 28, a transmitting unit 29, a synthesizer 30, a digital modulating/demodulating unit 31, a TDMA processing unit 32, a speech codec unit 33, a speech (voice) converting unit 34, a control unit 35, a ROM 36 and a RAM 37 in addition to the above-described antenna 21, LCD unit 22, key input unit 23, speaker 24, microphone 25 and ringer speaker 26, as shown in FIG. 4.

The antenna 21 is operated as follows. That is, this antenna 21 is used to transmit/receive a calling signal and a voice signal, which are in a preselected frequency band, to/from either the customer mother machine 3, or the public radio base stations 4 and 5. Furthermore, the signal received by this antenna 21 via the switch 27 is supplied to the signal receiving unit 28, whereas the signal inputted from the transmitting unit 29 via the switch 27 is transmitted by this antenna 21.

The switch 27 switches the connections between the receiving unit 28 and the transmitting unit 29 with respect to the antenna 21 under switching control by the control unit 35. Normally, the antenna 21 is connected via the switch 27 to the receiving unit 28, whereas the antenna 21 is connected via the switch 27 to the transmitting unit 29 during the transmitting operation.

When the receiving unit 28 receives the signal at the reception frequency band set by the synthesizer 30 via the switch 27 from the antenna 21, this reception signal is amplified at a preselected amplification and then the amplified signal is outputted to the digital modulating/demodulating unit 31. Upon receipt of the signal from the digital modulating/demodulating unit 31, the transmitting unit 29 transmits the signal at the predetermined frequency band set by the synthesizer 30 via the switch 27 from the antenna 21.

In synthesizer 30 sets such a frequency band to the receiving unit 28 and the transmitting unit 29 when the oscillation frequency band is instructed by the control unit 35.

The digital modulating/demodulating unit 31 digitally demodulates the received signal which has been digitally modulated and entered from the receiving unit 28 to output the demodulated signal to the TDMA processing unit 32. Also, the digital modulating/demodulating unit 31 digitally modulates the transmitted signal entered from the TDMA processing unit 32 to output the modulated signal to the transmitting unit 29.

The TDMA (Time Division Multiple Access) processing unit 32 owns the following functions. That is, the transmission/reception voice signals are supplied/received between the digital modulating/demodulating unit 31 and the speech codec unit 33 via this TDMA processing unit 32, and a communication control signal is supplied/received between the control unit 35 and this TDMA processing unit 32. In the TDMA processing unit 32 extracts the real data of the digital data received at a predetermined time slot, and also the header unit entered from the control unit 35 is added to the digital data (voice data) formed within the radio telephone and thereafter the resultant digital data is converted into a predetermined data format. Then the format-converted data is inserted into a predetermined time slot, which will be outputted to the digital modulating/demodulating unit 31.

The speech codec unit 33 expands the digital voice data which has been compressed by way of the ADPCM method and is entered from the TDMA processing unit 32, to output the digital expanded voice data to the speech converting unit 34, and also compresses the digital voice data entered from the speech converting 34 by way of the ADPCM method to output the digital compressed voice data to the TDMA processing unit 32.

The speech converting unit 34 is provided with an A/D converter and a D/A converter and so on. This speech converting unit 34 converts the digital voice data entered from the speech codec unit 33 into an analog voice signal which will then be supplied to the speaker 24, and further converts the analog voice signal entered from the microphone 25 into the digital voice data which will then be supplied to the speech codec unit 33.

The control unit 35 is constructed of a CPU (central processing unit) and the like. This control unit 35 executes the communication control process in accordance with the communication control process program stored in the ROM 36, so that the operations of the above-described various circuit units are controlled, and such an announcement made by the ringer speaker 26 that the telephone call is made is controlled, and also the display of the telephone number entered from the key input unit 23 on the LCD unit 22 is controlled. In addition, the control unit 35 executes the dialing process in accordance with a dialing process program (will be discussed later) previously stored in the ROM 36. During the execution of this dialing process, when the line connection with the opposite telephone cannot be established, the control unit 35 performs such a dialing process that the dialing signal is issued to the opposite telephone having the telephone number previously registered in the RAM 37. Then, the control unit 35 causes this telephone number in this dialing process to be displayed on the LCD unit 22.

The ROM (read-only memory) 36 previously stores therein the communication control process program and the dialing process program and the like, which are executed by the control unit 35.

The RAM (random access memory) 37 has a data area used to temporarily store the various data produced when the control unit 35 performs the communication control process and the dialing process. Furthermore, as illustrated in FIG. 6, another memory area is provided in the RAM 37, in which a plurality of names, telephone numbers, and other telephone numbers related thereto are stored. As to the first-mentioned telephone numbers, the telephone numbers for public use of the radio telephone (public telephone numbers) are stored, whereas as to the second-mentioned related telephone numbers, the telephone numbers for customer use of the radio telephones (private telephone numbers) and also the telephone numbers of the voice mail center 11 corresponding to the communication service center are stored.

The LCD unit 22 displays various sorts of display data entered from the control unit 35. The ringer speaker 26 produces the ringer sound in response to the ringer signal outputted when the calling signal is received during the communication control process executed by the control unit 35.

Overall Operation of First Telephone System

Before describing the overall operation of the telephone system according to the first preferred embodiment shown in FIG. 1, the telephone number registering methods will now be described.

First, both of the opposite (called) telephone numbers and the telephone numbers related thereto are previously registered in the radio telephones 6, 7, 8, 9. There are the below-mentioned methods for registering the telephone numbers.

1). When the register mode is set by operating the mode key 23c provided in the key input unit 23 of the radio telephone, the register image is displayed on the LCD unit 22. Then, the numeral entry keys 23f are manipulated to enter the customer telephone number, the public-use telephone number, and the telephone number of the voice mail center.

2). When the register key 23e provided in the key input unit 23 of the radio telephone is depressed during the telephone conversation, both of the public-use (public line) telephone number and the private-use (customer) telephone number, which have been previously registered into either the opposite radio telephone, or the opposite mother telephone, are fetched so as to be automatically registered. It should be noted that as to the second register method 2), since the telephone numbers previously registered into the opposite telephone are freely registered, such a register prohibit mode and the like must be employed in the radio telephone in order that the own telephone number is not registered into the opposite telephone without any permission.

As is apparent from the foregoing descriptions, the telephone number registering method may be achieved by employing other registering methods than the above-described registering method (1) and (2).

Communication Control Procedure

Referring now to a signal flow operation shown in FIG. 7, the communication control procedure will be described which is executed among the calling radio telephone 8, the network (public radio base stations 4, 5, communication line network 1, and control center 10), and the opposite radio telephone 9 and also the mother telephone 3. The radio telephone 8 sends the calling signal to the radio telephone 9 utilized as the cordless telephone of the customer mother telephone 3.

Figure 7:
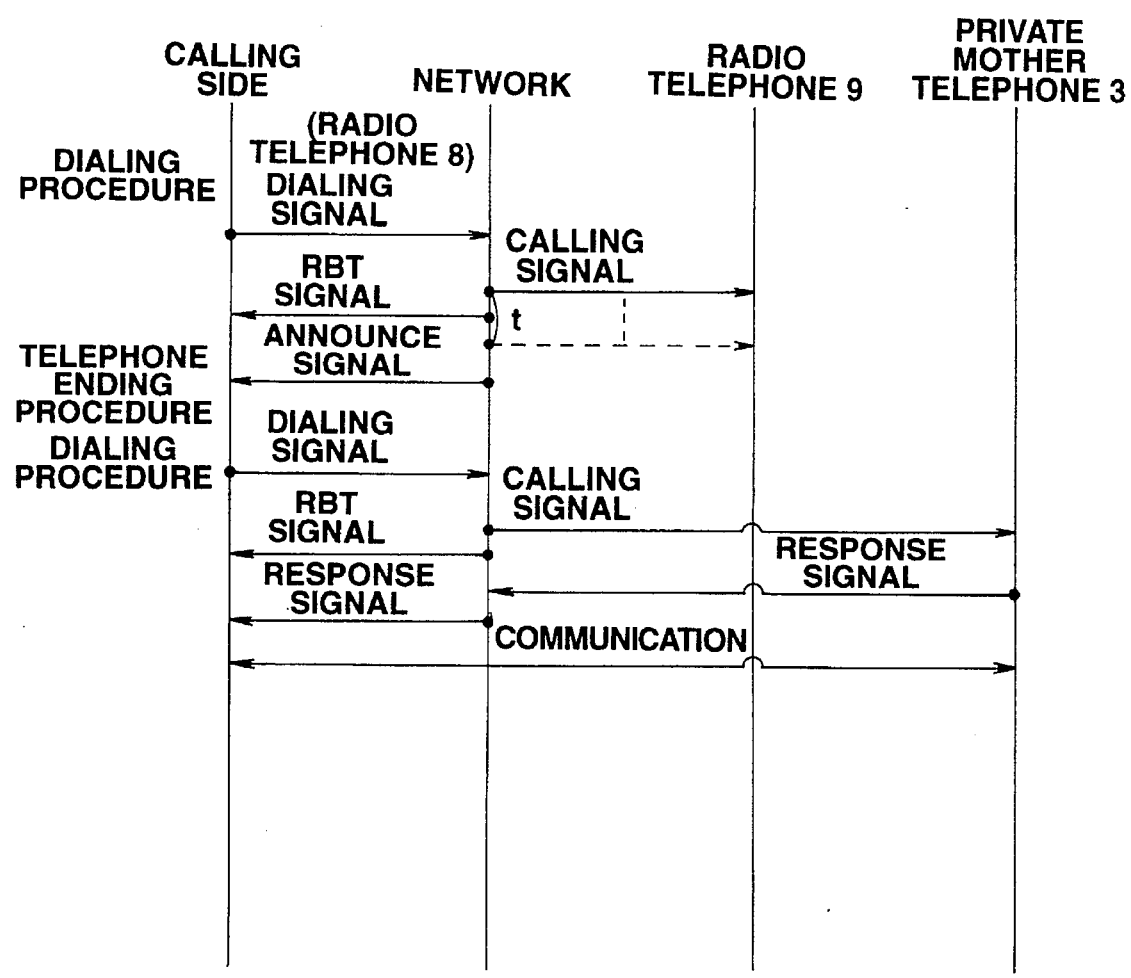
FIG. 7 schematically illustrates a flow of a communication control procedure executed among the calling radio telephone, the communication line network, and the called person when the telephone call is made from the radio telephone shown in FIG. 1.

In FIG. 7, when the telephone number (public telephone number) of the opposite radio telephone 9 is selected by operating the selection key 23d mounted on the key input unit 23 of the calling radio telephone 8 to be displayed, and thereafter the dialing key 23a is manipulated, the dialing signal in the radio signal is transmitted from the transmitting unit 29 of the radio telephone 8 via the antenna 21 toward the public radio base station 5. This dialing signal is sent from the public radio base station 5 via the station line to the communication line network 1. When this dialing signal is received so that the telephone number of the opposite radio telephone 9 is transferred from the communication line network 1 via the telephone line to the control center 10, the control center 10 retrieves from the memory shown in FIG. 2 whether or not the opposite telephone 9 has been registered. When this opposite radio telephone is registered, a calling signal is transmitted via the communication line network 1 to the opposite radio telephone 9.

At this time, the calling signal is outputted for a predetermined time period "t" (see FIG. 7), during which such an RBT (ring back tone) signal indicating that the telephone calling is made now is transmitted from the communication line network 1 to the calling radio telephone 8. When no response signal is returned from the opposite radio telephone 9 during this time period "t", such an announce signal that no answer is made from the called person is transmitted via the communication line network 1 to the radio telephone 8. It should be understood that when the radio telephone 9 is not registered, the control center 10 immediately transmits such an announce signal that this radio telephone 9 is to registered to the radio telephone 8.

When the user of the radio telephone 8 who has heard such an announce signal that no answer is received from the called person executes the telephone ending process by operating the telephone ending key 23b, the customer telephone number (the private telephone number) related to the public telephone number of the opposite radio telephone 9 previously registered into the RAM 37 is displayed on the LCD unit 22. Thereafter, the dialing process is executed by operating the dialing key 23a, so that the dialing signal in the radio signal is transmitted from the transmitting unit 29 employed in the radio telephone 8 via the antenna 21 to the public radio base station 5. Then, this dialing signal is transmitted from the public radio base station 5 via the telephone line to the communication line network 1. As a result, the dialing signal is sent to the mother telephone 3 of the opposite radio telephone 9, and also such an RBT signal that the telephone calling is made now is transmitted to the calling radio telephone 8.

When the response signal issued from the mother telephone 3 of the opposite radio telephone 9 is returned to the communication line network 1 in response to the transmission of this calling signal, the response signal is transmitted from the communication line network 1 to the calling radio telephone 8. As a result, the telephone line is connected so that the telephone communication is commenced between the calling radio telephone 8 and the mother telephone 3 of the opposite radio telephone 9 (or radio telephone 6). At this time, in case that the opposite radio telephone 9 is located within the communication area of the customer mother telephone 3 and is utilized as the cordless telephone of this customer mother telephone 3, the telephone conversation is commenced between the calling radio telephone 8 and the called (opposite) radio telephone 9.

Dialing Process Operation

Referring now to a flow chart shown in FIG. 8, a description will be made of the dialing process operation executed in the control unit 35 within the radio telephone 8.

Figure 8:
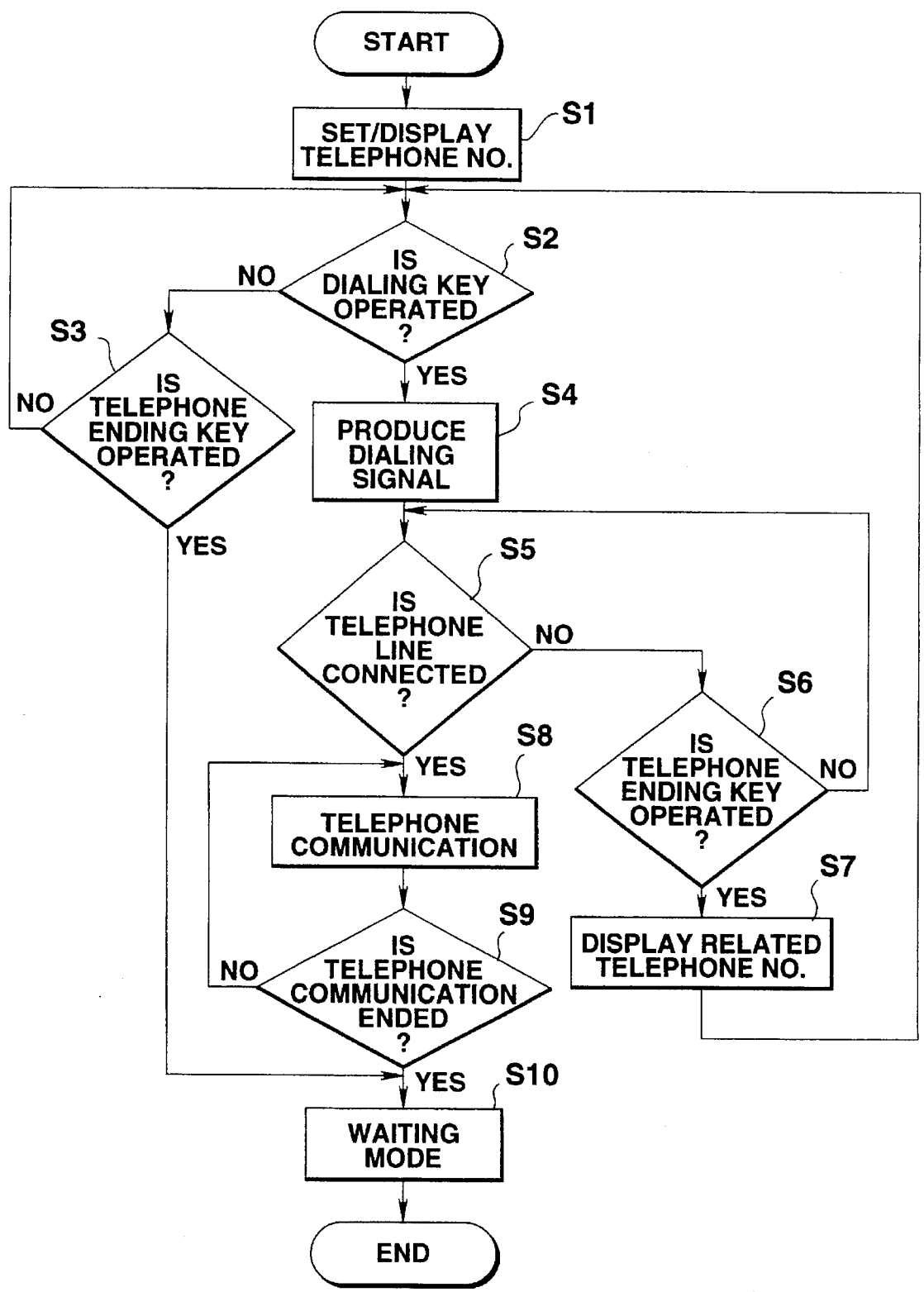
FIG. 8 is a flow chart for explaining a dialing procedure executed under control of the control unit shown in FIG. 5.

In FIG. 8, when the mode key 23c employed in the key input unit 23 of the radio telephone 8 is manipulated to set the memory dial mode the public telephone number of the opposite (called) radio telephone 9 is selected from the telephone number stored in the RAM 37 by operating the selection key 23d, the selected telephone number is displayed on the LCD unit 22 (see FIG. 9) at a first step S1. At the next step S2, a check is done as to whether or not the dialing key 23a is manipulated. When the dialing key 23a is not operated, another check is done as to whether or not the telephone ending key 23b is manipulated at a step S3. That is, when the telephone ending key 23b is not manipulated, the dialing process operation is returned to the step S2. Subsequently, this process operation is repeatively performed until either the dialing key 23a or the telephone ending key 23b is operated.

To the contrary, when the dialing key 23a is manipulated, the dialing output process to the telephone number selected and displayed at the step S4 is carried out. Subsequently, another judgement as to whether or not the telephone line is connected to the opposite (called) radio telephone 9 may be done by checking whether or not the above-described response signal transmitted from the communication line network 1 at a step S5. Also, another check is made as to whether or not the telephone ending key 23b is operated at a step S6. When neither the telephone line is connected, nor the telephone ending key 23b is operated, the process operation is returned to the previous step S5. Subsequently, the process operations defined at the step S5 and the step S6 are repeated until either the telephone line is connected, or the telephone ending key 23b is operated.

When the telephone ending key 23b is manipulated at the step S6, the customer telephone number of the opposite radio telephone 9 is displayed on the LCD unit 22 as shown in FIG. 10, and then the process operation is returned to the process operation defined at the step S2. As a consequence, the process operations defined at the step S2 and the step S3 are repeatively performed. When the dialing key 23a is manipulated, the dialing output process is carried out at a step S4, whereby the customer mother telephone 3 is called.

On the other hand, when the telephone line is connected between the calling radio telephone 8 and the opposite radio telephone 9 called at the step S5, the operation is brought into the telephone conversation condition at a step S8. Next, a check is done as to whether or not the telephone conversation is ended by checking whether or not the telephone ending key 23b is manipulated at a step S9. When it is so judged that the telephone conversation is ended, the waiting mode is set to complete this dialing process at a step S10.

When this dialing process is wanted to be ended, the telephone ending key 23b is manipulated at the previous step S3 to set the waiting mode so that this dialing process is accomplished.

As previously described, in accordance with the first preferred embodiment, either the private (customer) telephone number related to the public telephone number, or the telephone number of the voice mail center is previously stored within the RAM 37 employed in the radio telephone 8. When no response is issued from the called radio telephone, the related telephone number, namely either the customer telephone number, or the telephone number of the voice mail center is automatically displayed on the LCD unit 22 and then the dialing operation can be made by operating only the dialing key. As a result, the message can be recorded by utilizing the automatic answering function provided in the mother telephone. When the opposite radio telephone is set within the home, the message can be sent via the mother telephone.

When the dialing operation is made to the voice mail center 11, the message may be inputted by designating the message storage unit which has been allocated to the calling person.

Accordingly, since the call connecting efficiency when the desired radio telephone is dialed in the second generation cordless telephone system can be increased, the utilization efficiency of this second generation cordless telephone system can be improved.

The first preferred embodiment has been described with respect to such a case that the telephone number (public telephone number) registered in the telephone number column of the memory map shown in FIG. 6 is selectively displayed, and when this displayed telephone number is dialed and then no telephone line is connected, the related telephone number (customer telephone number) previously registered in the memory map is dialed. Alternatively, when the telephone number (customer telephone number) registered into the relevant telephone number column of the memory map shown in FIG. 6 is selectively displayed and when the displayed telephone number is dialed, no telephone line is connected, the corresponding telephone number (public telephone number) registered in the telephone number column may be dialed.

Second Radio Telephone Used in Telephone System

Referring now to FIG. 11 to FIG. 14, a radio telephone according to a second preferred embodiment utilized in the second generation cordless telephone system will be described.

FIG. 11 schematically shows a memory map for storing a plurality of names, a plurality of telephone numbers, and a plurality of telephone numbers (first related telephone number, second related telephone number) related to the first-mentioned telephone numbers. This memory map is provided within the RAM 37 of the radio telephone 6, 7, 8, or 9. As the telephone number, the public telephone number is stored. As the first related telephone number, the private (customer) telephone number is stored. As the second related telephone number, the telephone number of the voice mail center is stored.

Dialing Process Operation Executed in Second Telephone System

Since the overall telephone system to which the radio telephone according to the second preferred embodiment is applied is the same as the first-mentioned telephone system of FIG. 1, no further description thereof is made in the following description.

Then, the dialing process operation executed in the control unit 35 employed in the radio telephone 6, 7, 8, or 9 according to the second preferred embodiment will now be described with reference to a flow chart shown in FIG. 12.

It should be noted that the same processing steps shown in the flow chart of FIG. 8 are indicated by the same reference numerals in the below-mentioned flow chart, and no further explanations thereof will be made.

Figure 12:
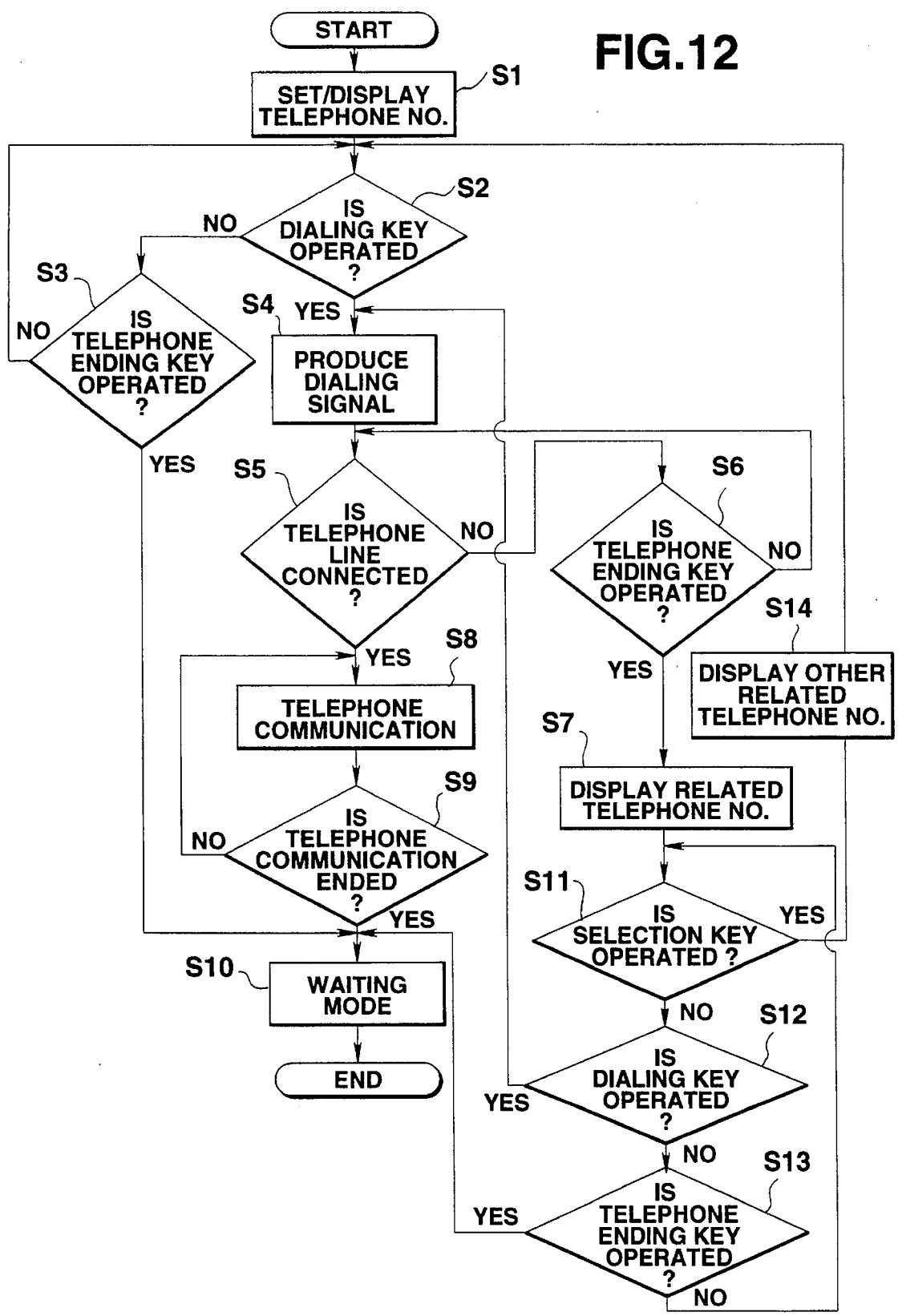
FIG. 12 is a flow chart for explaining another dialing procedure executed under control of the control unit shown in FIG. 5.

In the flow chart of FIG. 12, assuming now that the public telephone number shown in FIG. 11 is set/displayed by operating the selection key 23d as illustrated in FIG. 9 at a step S1, the dialing signal is issued based on the set/ displayed public telephone number by operating the dialing key 23a and then no telephone line is connected. In this case, when the telephone ending key 23b is manipulated by the telephone calling person at a step 6, the customer telephone number corresponding to the first related telephone number 1 and such a mark "CONT" indication that also a related telephone number has been registered is displayed as illustrated in FIG. 13 (step S7).

Thereafter, a check is done as to whether or not the selection key 23d is operated in order to display the other relevant telephone number at a step S11. When the selection key 23d is not operated, another check is done as to whether or not the dialing key 23a is operated at a step S12. When this dialing key 23a is not operated, a further check is done as to whether or not the telephone ending key 23b is manipulated (step S13). Then, if the telephone ending key 23b is not manipulated, then the process operation is returned to the step S11. Subsequently, this process operation is repeated until the dialing key 23a, the telephone ending key 23b, or the selection key 23d is manipulated.

When the telephone calling person confirms that the mark "CONT" is displayed and then operates the selection key 23d at the step S11, as shown in FIG. 14, the telephone number of the voice mail center corresponding to the second related telephone number is displayed at a step S14. Then, the process operation is returned to the step S2. As a consequence, when the dialing key 23a is manipulated at the step S2, the dialing output process operation to the telephone number of the voice mail center under display is performed (step S4).

To the contrary, when the dialing key 23a is operated at the step S12, the process operation is returned to the step S4 at which the dialing output process to the customer telephone number displayed at the step S7 is executed.

In case that this dialing output process is executed and then the telephone line is not connected, when the telephone ending key 23b is operated by the telephone caller at the step S6, the telephone number of the voice mail center corresponding to the second related telephone number is displayed. In other words, in case that the dialing output process to the related telephone number is executed and the telephone line is not connected, when the telephone ending key 23b is manipulated, another related telephone number is displayed.

Also when the telephone ending key 23b is operated at the step S13, the process operation is brought into the waiting mode at the step S10 and this process operation is accomplished.

It should be understood that when only one telephone number related to the telephone number set at the step S1 is registered, the "CONT" mark is not displayed, but another display is made as shown in FIG. 10.

As previously described in the second preferred embodiment, the telephone number (public telephone number) registered in the telephone number column of the memory map shown in FIG. 11 is selected and displayed. When the telephone call is made to this displayed telephone number, if no telephone line is connected, then a selection is made of the desirable telephone number from the first and second related telephone numbers (namely, customer telephone number, and telephone number of voice mail center) which have been registered in the first and second related telephone number column. Alternatively, it is also possible that, for instance, the telephone number (customer telephone number) registered in the first related telephone number column of the memory map shown in FIG. 11 is selected/displayed. When the telephone call is made to this displayed customer telephone number and the telephone line is not connected, a desirable telephone number may be selected from the corresponding telephone numbers (public telephone number, and telephone number of voice mail center) registered in the telephone number column and the second related telephone number column of this memory map.

Also, although the two related telephone numbers have been registered in the memory map as illustrated in FIG. 11, more than three related telephone numbers may be registered in this memory map.

Third Telephone System

Figure 15:
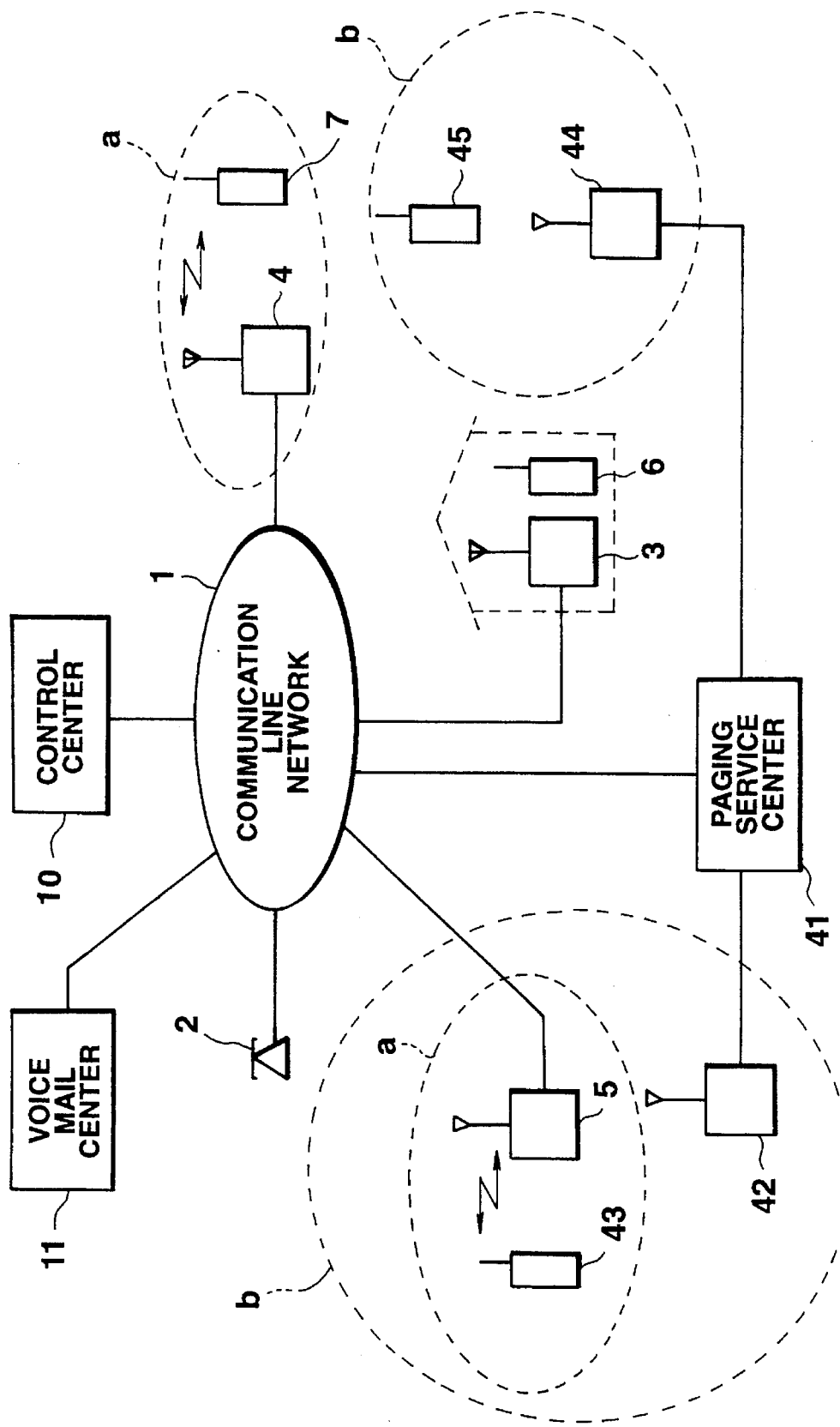
FIG. 15 schematically shows another overall system arrangement constructed of a paging system and a second generation cordless telephone system.

Referring now to FIG. 15 to FIG. 18, a radio telephone according to a third preferred embodiment of the present invention will be described which is utilized in the second generation cordless telephone system. FIG. 15 schematically indicates an overall arrangement of the telephone system constructed of the second generation cordless telephone system and a paging system. It should be noted that the same reference numerals shown in the previous second generation cordless telephone system are employed as those for denoting the same or similar components of FIG. 15.

In this telephone system of FIG. 15, reference numeral 41 shows a paging service center, reference numerals 42 and 44 indicate paging radio base stations connected via a communication line to the paging service center 41, and also reference numerals 43 and 45 represent radio telephones with the paging function, which owns both a radio telephone function in the second generation cordless telephone system and a paging function in the paging system.

A range defined by a dotted line "a" indicates each radio communication area of the public radio base stations 4 and 5, whereas another range defined by another dotted line "b" shows each radio communication area of the paging radio base stations 42 and 44.

As a consequence, when the radio telephone 43 and 45 with the paging function are located within the radio communication area "a", these radio telephones may access the public radio base stations 4 and 5 to establish telephone communications with the opposite (called) radio telephone. When the radio telephones 43 and 45 are located within the radio communication area "b", these radio telephones may access the paging radio base stations 42 and 44 to function as the pagers.

Figure 16:
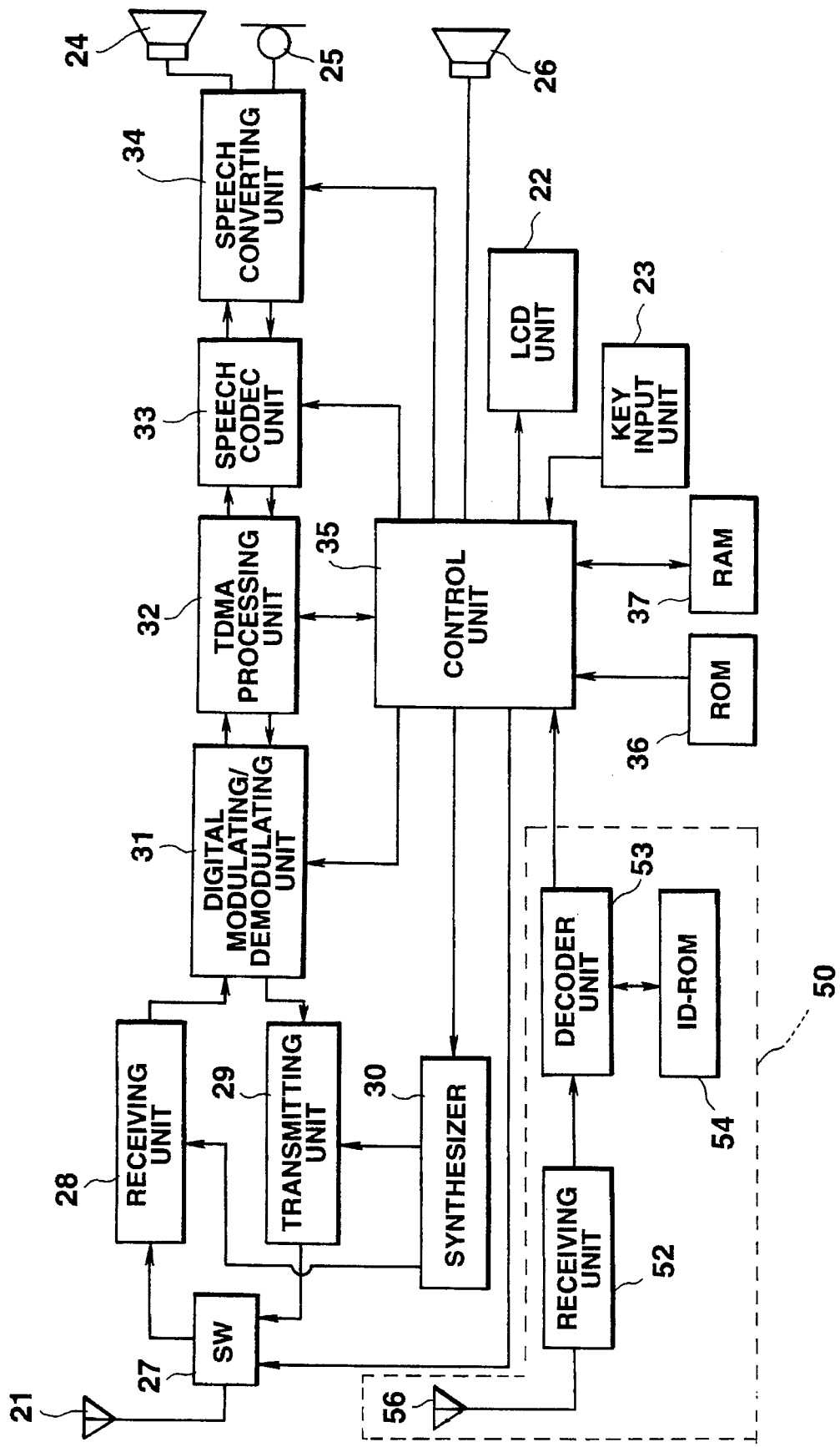
FIG. 16 is a schematic block diagram for representing a radio telephone equipped with a paging function utilized as a pager and a radio telephone of FIG. 15.

FIG. 16 is a schematic block diagram for indicating the internal circuit arrangement of the respective radio telephones 43 and 45 equipped with the paging function shown in FIG. 15. The same reference numerals shown in the radio telephone arrangement of FIG. 5 will be employed so as to denote the same or similar circuit components represented in FIG. 16, and detailed descriptions thereof are omitted.

Reference numeral 50 shows a pager function unit employed in each of these radio telephones 43 and 45 equipped with the paging function. In this pager function unit 50, antenna 51 receives a signal containing a calling signal having a preselected frequency band transmitted from the paging radio base stations 42 and 44 (see FIG. 15), and then supplies this received signal to a receiving unit 52.

Upon receipt of the received signal with the preselected frequency band from the antenna 51, the receiving unit 52 amplifies this received signal at a preselected amplification and thereafter digitally demodulates this amplified signal. Then, the digitally demodulated signal is supplied to a decoder unit 53.

The decoder unit 53 decodes the digitally demodulated signal to supply a coincidence detection signal and a message signal subsequent to this coincidence detection signal to a control unit 35 when this decoded signal is directed to the own radio telephone, namely when the ID code contained in this digitally demodulated signal is made coincident with the ID code fetched from an ID-ROM 54.

The ID-ROM 54 previously stores the ID codes and the like and outputs the ID codes to the decoder unit 53 under control of this decoder unit 53.

FIG. 17 schematically shows a memory map for previously storing a plurality of names, a plurality of telephone numbers, and a plurality of other telephone numbers related to these public telephone numbers, which are used for the radio telephones 6 and 7 according to the third preferred embodiment. It should be understood that these telephone numbers correspond to the customer telephone numbers, the telephone numbers of the voice mail center, and the calling telephone numbers of the pagers (paging telephone number).

Operations of the radio telephone according to a third preferred embodiment will be described with reference to FIGS. 15 to 18.

First, with respect to a method for registering telephone numbers and paging telephone numbers related to these telephone numbers into the radio telephones 6 and 7, the previously explained telephone number registering methods (1) and (2) may be utilized.

That is, the register mode is set by operating the mode input key 23c of the key input unit 23 provided with the radio telephones 6 and 7. Then, while the numeral entry key 23f is manipulated, the public telephone number, the private telephone number, or the pager calling number (paging telephone number) is registered. Otherwise, when the register key 23e of the key input unit 23 employed in the radio telephone 6 or 7 is depressed during telephone conversation, in case that the called person belongs to the radio telephones 43 and 45 with the paging functions, both the public telephone numbers which have been previously registered into the radio telephones 43 and 45 with the paging function, and the pager calling numbers corresponding to the public telephone numbers are fetched into these radio telephones to be automatically registered.

In accordance with the above-described register method, the telephone numbers, and other telephone numbers related thereto, for instance, the pager calling numbers are registered in the RAM 37 of the respective radio telephones 6 and 7.

Next, the communication control sequence (procedure) effected when the telephone communication is established between the radio telephone 6 and the radio telephone 45 with the paging function as shown in FIG. 15 will now be explained with reference to an operation signal flow of FIG. 18.

It should be noted that the dialing process performed in the control unit 35 employed in the radio telephone 6 is carried out in accordance with the flow chart of FIG. 8.

First, in the radio telephone 6, the telephone number (namely, public telephone number) of the radio telephone 45 with the paging function to be called is selected and displayed by operating the selection key 23d provided in the key input unit 23. When the dialing key 23a is manipulated, the dialing signal is transmitted from the transmitting unit 29 employed in the radio telephone 6 via the antenna 21 in form of the radio signal to the customer mother telephone 3. From this customer mother telephone 3, the dialing signal is sent via the telephone line to the communication line network 1.

When the telephone number of the called radio telephone 45 with the paging function is transmitted from the communication line network 1 to the control center 10 in response to this dialing signal, a check is done as to whether or not the radio telephone 45 with the paging function is registered in the control center 10 by retrieving the memory as shown in FIG. 12. When this radio telephone 45 is registered, the calling signal is transmitted via the communication line network 1 to the radio telephone 45 with the paging function to be called.

Figure 18:
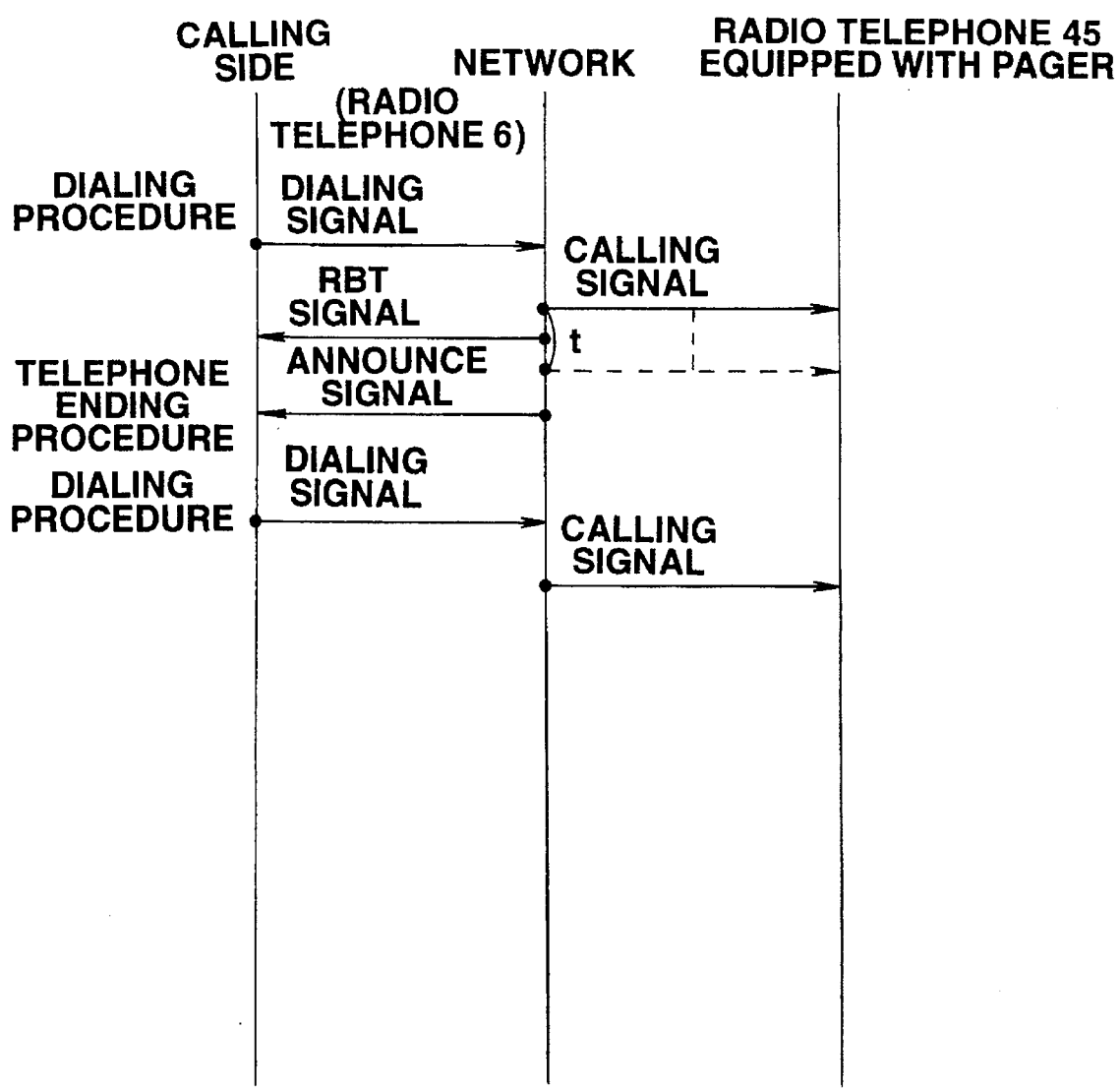
FIG. 18 schematically illustrates a flow of a communication control procedure among the calling radio telephone, the communication line network, and the called radio telephone equipped with the paging function when the telephone call is made from the radio telephone of FIG. 15.

At this time, as illustrated in FIG. 18, the calling signal is outputted for a time period of "t" seconds, during which such an RBT signal that informs the calling operation is transmitted from the communication line network 1 to the calling radio telephone 6. If no response signal is returned from the radio telephone 45 with the paging function during this time period "t" seconds, such an announce signal that informs no response is transmitted via the communication line network 1 to the radio telephone 6.

In other words, according to the third preferred embodiment, since the called radio telephone 45 with the paging function is located within the radio communication area "b" for the pager which is out of the radio communication area "a" for the public radio base station 4, the calling signal transmitted from the radio telephone 6 via the public radio base station 4 cannot reach the radio telephone 45 with the paging function.

When the user of the radio telephone 6 side 6 who has heard that no answer is made from the called person by way of this announce signal executes the telephone ending process by operating the telephone ending key 23b, the telephone number related to the public telephone number of the opposite radio telephone 45 with the paging function, which has been previously stored in the RAM 37, namely the pager calling number is displayed on the LCD unit 22.

Thereafter, the dialing process is performed by operating the dialing key 23a, so that the dialing signal is transmitted from the transmitting unit 29 employed within the radio telephone 6 via the antenna 21 in form of the radio signal to the customer mother telephone 3. Then, the dialing signal is transmitted from the customer mother telephone 3 via the communication line network 1 to the paging service center 41. As a result, after a register confirmation is made as the pager for the radio telephone 45 with the paging function in the paging service center 41, the calling signal is sent from the paging service center 41 via the trunk line to the paging radio base stations 42 and 44, and another calling signal is transmitted from the paging radio base stations 42, 44 to the opposite radio telephone 45 with the paging function.

Since this calling signal is transmitted, the opposite (called) radio telephone 45 with the paging function may receive the pager call issued from the calling radio telephone 6 by the pager function unit 50.

On the side of the radio telephone 45 with the paging function which has received the pager calling from the paging system, the user who takes this radio telephone 45 with the paging function is moved into, for example, the radio communication ares "a" of the public radio base station 4, and then dials the radio telephone 6. As a result, the telephone conversation can be started between this radio telephone 6 and the radio telephone 45.

As previously described in detail, in the radio telephone according to a third preferred embodiment arranged by the second generation cordless telephone system and the paging system, when the telephone calling is made to the radio telephone equipped with the paging function by utilizing the second generation cordless telephone system, the pager calling number previously registered as the relevant telephone number can be simply dialed in such a case that no telephone line can be connected between them. Therefore, since the opposite radio telephone with the paging function can be called with utilizing such a wider radio communication area of the pager, the call connection efficiency can be improved. As a consequence, the utilization efficiency of the second generation cordless telephone system can be increased.

It should also be noted that although the present invention has been applied to the radio telephones 6, 7, 8, 9 in the above-explained preferred embodiment, the present invention may be similarly applied to the telephone 2 and the customer mother telephone 3 shown in FIG. 1, and also to the radio telephones 43 and 45 equipped with the paging function as shown in FIG. 15. That is, the present invention may be applied to any types of telephones.

What is claimed is:

1. A telephone with an auto dialing function and having operation keys, comprising:

memory means for storing a telephone number and a telephone number related to the first-mentioned telephone number;

selecting means for selecting a telephone number from the telephone numbers stored in said memory means;

display means for displaying the telephone number selected by said selecting means;

call instruction means for producing a call instruction to make a telephone call to the telephone number displayed on said display means;

calling means for making a telephone call to the telephone number displayed on said display means upon receipt of the call instruction produced by said call instruction means; and display control means for controlling said display means to display thereon a telephone number stored in said memory means and related to the telephone number to which the telephone call was made by said calling means, when a predetermined operation key is operated while a telephone call to the telephone number is not yet established, whereby the related telephone number is displayed on said display means and is ready for placing a telephone call.

2. A telephone as claimed in claim 1 wherein said memory means stores a plurality of telephone numbers of the called persons and a plurality of telephone numbers related thereto.

3. A telephone as claimed in claim 1 wherein said memory means stores a plurality of telephone numbers related to said telephone number of the called person.

4. A telephone as claimed in claim 3, wherein said selecting means includes means for selecting a desired telephone number from said plurality of related telephone numbers stored in said memory means when a predetermined operation key is operated while a telephone call to said telephone number is not yet established.

5. A telephone as claimed in claim 4, wherein:

said display control means controls said display means to display thereon a telephone number from among the telephone numbers stored in said memory means and related to the telephone number to which the telephone call was made by said calling means, when a predetermined operation key is operated while a telephone call to the telephone number is not yet established, and further controls said display means to display such information indicating that another related telephone number other than the related telephone number being displayed is stored in said memory means.

6. A telephone as claimed in claim 1 wherein:

said telephone number of the called person corresponds to a public telephone number of a radio telephone capable of establishing a communication channel by way of a radio communication between a public radio base station connected to a communication line network and a private radio base station connected to said communication line network corresponding to an own mother telephone; and said related telephone number corresponds to a private telephone number of said radio telephone.

7. A telephone as claimed in claim 1 wherein:

said telephone number of the called person corresponds to a private telephone number of a radio telephone capable of establishing a communication channel by way of a radio communication between a public radio base station connected to a communication line network and a private radio base station connected to said communication line network corresponding to an own mother telephone; and said related telephone number corresponds to the public telephone number of said radio telephone.

8. A telephone as claimed in claim 1 wherein:

said telephone number of the called person corresponds to a public telephone number of a radio telephone capable of establishing a communication channel by way of a radio communication between a public radio base station connected to a communication line network and a private radio base station connected to said communication line network corresponding to an own mother telephone; and said related telephone number corresponds to a telephone number of a communication service center.

9. A telephone as claimed in claim 1 wherein:

said telephone number of the called person corresponds to a public telephone number of a radio telephone capable of establishing a communication channel by way of a radio communication between a public radio base station connected to a communication line network and a private radio base station connected to said communication line network corresponding to an own mother telephone; and said related telephone number corresponds to a telephone number used to call a pager.

10. A telephone as claimed in claim 9 wherein a pager called by using said telephone number for calling the pager is added to said radio telephone.

11. A telephone with an auto dialing function and having operation keys, comprising:

memory means for storing a plurality of desired telephone numbers and a plurality of related telephone numbers respectively related thereto;

selecting means for selecting a telephone number from the plurality of desired telephone numbers stored in said memory means;

display means for displaying the telephone number selected by said selecting means;

call instruction means for producing a call instruction to make a telephone call to the telephone number displayed on said display means;

calling means for making a telephone call to the telephone number displayed on said display means upon receipt of the call instruction produced by said call instruction means; and display control means for controlling said display means to display thereon one of said plurality of related telephone numbers stored in said memory means and related to the telephone number to which the telephone call was made by said calling means, when a predetermined operation key is operated while a telephone call to the telephone number called by said calling means is not yet established, whereby the one related telephone number is displayed on said display means and is ready for placing a telephone call.

12. The telephone as claimed in claim 11, wherein each of said desired telephone numbers is related to at least two of said related telephone numbers.

* * * * *